(12) United States Patent
Chichilnisky

(10) Patent No.: US 11,657,452 B2
(45) Date of Patent: May 23, 2023

(54) OFFTAKE-BASED ASSET BACKED SECURITIES AND CO2 REMOVAL MODELS

(71) Applicant: Graciela Chichilnisky, New York, NY (US)

(72) Inventor: Graciela Chichilnisky, New York, NY (US)

(*) Notice: Subject to any disclaimer, the term of this patent is extended or adjusted under 35 U.S.C. 154(b) by 29 days.

(21) Appl. No.: 17/247,227

(22) Filed: Dec. 4, 2020

(65) Prior Publication Data
US 2021/0174446 A1 Jun. 10, 2021

Related U.S. Application Data

(60) Provisional application No. 62/943,571, filed on Dec. 4, 2019.

(51) Int. Cl.
*G06Q 40/04* (2012.01)
*G06Q 20/36* (2012.01)
*G06Q 40/06* (2012.01)
*H04L 9/06* (2006.01)
*G06Q 40/03* (2023.01)
*H04L 9/00* (2022.01)

(52) U.S. Cl.
CPC ......... *G06Q 40/04* (2013.01); *G06Q 20/3672* (2013.01); *G06Q 20/3674* (2013.01); *G06Q 40/03* (2023.01); *G06Q 40/06* (2013.01); *H04L 9/0618* (2013.01); *H04L 9/50* (2022.05)

(58) Field of Classification Search
None
See application file for complete search history.

(56) References Cited

U.S. PATENT DOCUMENTS

2022/0156754 A1* 5/2022 MacArthur .......... G06Q 30/018

* cited by examiner

*Primary Examiner* — Namrata Boveja
*Assistant Examiner* — Amit Patel
(74) *Attorney, Agent, or Firm* — Leason Ellis LLP

(57) ABSTRACT

Methods, systems and apparatuses, including computer programs encoded on computer storage media, are described herein to manage transactions relating to assets, such as carbon dioxide ("CO2") offtake agreements, via a distributed ledger system. The platform may allow for authorized users to create large bundles of CO2 offtake agreements, transfer offtake bundles to other users in exchange for payment, create and issue securities backed by offtake bundles and/or manage various payments and contractual obligations relating to the same.

20 Claims, 10 Drawing Sheets

OFFTAKE-BASED ASSET BACKED SECURITIES AND CO2 REMOVAL MODELS

CROSS-REFERENCE TO RELATED APPLICATIONS

The present application claims the benefit of priority to U.S. provisional patent application Ser. No. 62/943,571, titled "OFFTAKE-BASED ASSET BACKED SECURITIES AND CO2 REMOVAL MODELS," filed Dec. 4, 2019, which is incorporated by reference herein in its entirety.

BACKGROUND

This specification relates generally to systems and methods that utilize distributed ledger technology to manage and facilitate transactions relating to asset-backed securities among multiple parties.

The need for climate action has never been more urgent. As emissions of greenhouse gases, such as carbon dioxide ("CO2"), continue to rise, increasingly severe natural disasters and chronic changes in weather patterns have the potential to weaken global economic growth, including through impacts on human health and well-being, physical assets, and returns on affected investments. Already, the physical risks of climate change have begun to materialize: extreme weather, intensified by climate change, is estimated to have driven the majority of the over $600 billion in natural catastrophe losses over the past three years. These impacts have occurred with just 1° C. of warming above pre-industrial levels.

Experts caution that 1.5° C. and 2° C. of warming will affect human populations and natural systems—with a notable escalation of economic and ecosystem impacts between these two temperature levels. Unfortunately, global warming is likely to reach 1.5° C. between 2030 and 2052 if it continues to increase at the current rate.

It is widely recognized that CO2 emissions will need to be decreased to net zero in order to limit average global temperature rise. Net global CO2 emissions are derived from the gross amount of CO2 that humans annually emit into the atmosphere reduced by the amount of anthropogenic CO2 removal ("CDR") in each year. Because it is not currently possible to reduce gross emissions to anywhere near zero, the only way to achieve net zero emissions in a timely fashion (i.e., before global warming increase above 1.5° C.) is with significant deployment of CDR technology.

Direct air capture ("DAC") technology offers a particularly attractive solution, as it provides the ability to control CO2 without direct intervention in the biosphere and with relatively modest land use. DAC absorbs CO2 directly from air and may be driven by low-temperature heat, such as low-cost "process heat" that is a by-product of energy production. The amount of heat required for regeneration is greatly reduced, making possible large extraction capacities in sites where process heat is available, such as power plants, cement smelters, oil refineries and other industrial establishments.

Large-scale deployment of DAC technology will require significant investment. DAC project developers typically obtain financing on a project-by-project basis through bank loans (i.e., project financing) secured by all of the borrower's assets, including commercial contracts such as offtake agreements. An estimated $6 trillion in project financing (PF) is needed to build out the DAC systems required to remove at least 30 gigatonnes of CO2 per year by 2031—an important milestone to ensuring warming does not increase above 1.5° C. Despite significantly increased investment in certain low-carbon sectors, such as clean power generation, DAC projects have not received the same attention from investors.

Securitization offers the promise of new capital to finance DAC projects. Securitization is the process by which illiquid assets are pooled and processed into financial vehicles (securities), which are then sold to investors. This process not only confers liquidity by providing investors a standardized, tradable product, but it can also reduce various risks associated with the individual assets.

In a typical securitization process, once an asset tied to a cash flow is originated, it is registered electronically to record ownership and other relevant data. The asset is then placed into a pool or bundle with other assets, which may be governed by a trust. The trust defines certain legal rights and obligations of the securitization, and also governs loss structures, cashflow waterfalls, and other investor rights. The transfer of the assets into the trust is treated as a "true sale," which reduces the liability for the originator of the assets and ensures that investors have and will retain legal rights to ownership. The sale price must be for the market value of the assets, and the proceeds go to the originator. The originator receives the cash and, in many cases, a removal of the assets from its balance sheet.

Once the assets are pooled and isolated in the trust, investors may purchases the rights to the securitized cash flows in the form of a fixed income security. This purchase is essentially a borrowing transaction, whereby the investor allocates capital, indirectly, to the originator and receives a fixed rate of return as that originator repays its securitization debt.

Navigating the above process can prove a formidable task, requiring careful management and validation of contractual terms, payments, and obligations of various entities. Accordingly, there remains a need for applications, systems and methods to facilitate securitization of cash flows tied to assets (e.g., CO2 offtake agreements) relating to DAC and other CO2 removal projects. It would be beneficial if such systems were decentralized to increase transparency and lower costs relating to offtake-backed securities through automation of various tasks, while providing a more liquid and diversified solution for market participants.

SUMMARY

In accordance with the foregoing objectives and others, exemplary applications, methods and systems are disclosed herein to manage and facilitate various financial instruments and transactions relating to DAC and other CO2 removal projects. The disclosed embodiments utilize distributed ledger technology to facilitate origination, payments, disbursements, transfers, validation, distribution, recordation and/or other transactions associated with CO2-related assets (e.g., CO2 offtake agreements), securities (e.g., securitized offtake agreements), and various transactions relating to the same. The embodiments may provide comprehensive, permanent records of all validated transactions, and may make such information available to relevant parties.

The embodiments allow the bundling of any number of offtake agreements. Importantly, bundling large amounts of offtakes confers the benefits of the law of large numbers, under which uncertainty and risk decrease (by the law of large numbers) without an attendant increase on payment or prices.

In one aspect of the embodiments, a method is provided wherein offtake information is received for each of a plurality of offtake agreements. The offtake information may include purchaser information relating to a purchaser associated with the respective offtake agreement; an amount of carbon dioxide ("CO2") to be purchased by the purchaser at one or more times during a term of the respective offtake agreement; and/or a price to be paid by the purchaser for the amount of CO2. The method may further include creating, for each of the plurality of offtake agreements, an offtake token for use with a distributed ledger system, each offtake token associated with the respective offtake information; associating each of the offtake tokens with an originator portfolio relating to an originator and associated with the distributed ledger system to thereby create a bundle of offtake tokens; and creating a first distributed ledger transaction to transfer the bundle of offtake tokens from the originator portfolio to an issuer portfolio relating to an issuer and associated with the distributed ledger system. The method may also include transferring the bundle offtake tokens from the originator portfolio to the issuer portfolio, based on a determination that a plurality of required signers associated with the first distributed ledger transaction have signed the transaction. Additionally or alternatively, the bundle of offtake tokens may be transferred to the issuer portfolio based on a determination that a payment has been transferred from the issuer to the originator.

The above method may also include creating a plurality of note tokens for use with the distributed ledger system, each note token of the plurality of note tokens representing a security backed by the bundle of offtake tokens. The note tokens may be associated with note information, such as but not limited to, a principal amount, an interest rate, a maturity date and/or a credit rating. Accordingly, in some cases, the method may include creating a second distributed ledger transaction to transfer one or more of the plurality of note tokens to an investor portfolio relating to an investor and associated with the distributed ledger system. The one or more note tokens may be transferred to the investor portfolio based on a determination that various required signers have signed the second distributed ledger transaction (e.g., the issuer and the investor) and/or based on a determination that a note payment has been transferred from the investor to the issuer.

The method may include receiving purchaser payments from one or more of the purchasers associated with the offtake tokens in the bundle of offtake tokens and distributing a portion of the purchaser payments to the investor based on the note information of the one or more note tokens.

The method may additionally or alternatively include storing credit enhancement information, such as a credit enhancement portfolio for use with the distributed ledger system and/or one or more credit enhancement rules specifying when funds held in the credit enhancement portfolio are to be distributed to holders of the note tokens. It will be appreciated that at least a portion of the credit enhancement portfolio funds may be provided via a credit card loans portfolio that is itself funded from credit card loans proceeds.

In another aspect of the embodiments, a non-transitory computer readable medium including executable instructions is provided. The executable instructions, while executed, cause a processor to perform processing steps including: creating, for each of a plurality of offtake agreements, an offtake token for use with a distributed ledger system, each offtake token associated with a purchaser; associating each of the offtake tokens with an originator portfolio relating to an originator and associated with the distributed ledger system to thereby create a bundle of offtake tokens; and executing a first distributed ledger transaction to transfer the bundle of offtake tokens from the originator portfolio to an issuer portfolio relating to an issuer and associated with the distributed ledger system.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
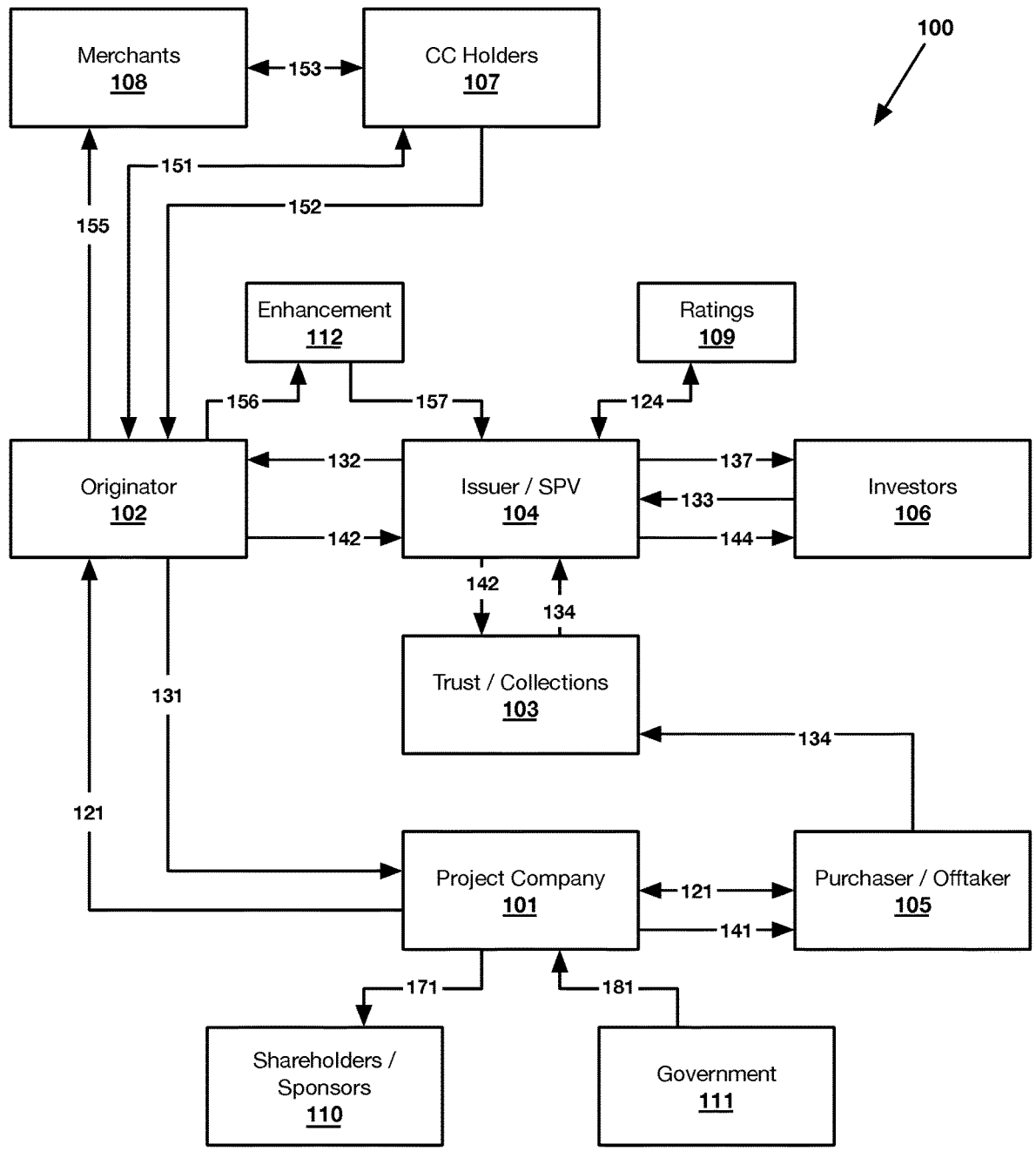
FIG. 1 shows an exemplary flow diagram according to an embodiment.

Various systems and methods are provided herein that employ distributed ledger technology to facilitate origination, payment, disbursement, transfer, validation, distribution, recordation and/or other transactions relating to financial instruments, such as credit cards, tax credits, CO2 offtake agreements and securities (e.g., securitized CO2 offtake agreements). The embodiments may be employed to increase efficiency, data integrity, and transparency in various financing markets that require proof of existence, records of ownership, contractual payment terms, and/or complex ownership structures. Moreover, the embodiments may prevent manipulation of transactions relating to managed financial instruments (e.g., origination, purchase, payments, trading and/or termination) by requiring consensus and verification of specific parties in order to record transactions.

In certain embodiments, a unique digital asset referencing a single real-world object (e.g., a CO2 offtake agreement) may be created and recorded in a distributed ledger, such as the blockchain. Such digital assets (also referred to as "asset tokens" "offtake tokens" or "tokens") may be employed to facilitate recordation, confirmation and validation of various financial transactions among multiple parties, such as project developers, sellers, purchasers, originators, investors, validators and others.

As detailed below, the embodiments allow for any number of offtake agreements (e.g., each represented by an offtake token) to be grouped, bundled or pooled together. The embodiments further allow for such bundles to be transferred from one party to another and for various financial vehicles (e.g., securities) backed by such bundled offtakes to be created and sold to investors.

It will be appreciated that, by facilitating the bundling of many offtake agreements, the embodiments provide for the reduction of various risks associated with individual offtake agreements (e.g., supply risk, offtake risk, etc.). More particularly, because offtake bundles may be created such that the risks associated with each offtake agreement are reasonably independent across a given bundle, the law of large numbers dictates that the average value across a large bundle of offtakes should be close to the expected value and will tend to become closer to the expected value as the size of the bundle increases.

Indeed, the embodiments may provide numerous benefits for originators, investors and developers. For originators, securitization of CO2 offtakes improves returns on capital by converting an on-balance-sheet receivable into an off-balance-sheet fee income stream that is less capital intensive. Depending on the type of structure used, securitization may also lower costs, release additional capital for expansion or reinvestment purposes, and improve asset/liability and credit risk management.

For investors, the securitized CO2 offtakes may offer a combination of attractive yields (compared with other instruments of similar quality), increasing secondary market liquidity, and generally more protection by way of collateral overages and/or guarantees by entities with high and stable credit ratings (e.g., CO2 offtakers). They also offer a measure of flexibility because their payment streams can be structured to meet investors' particular requirements. Although the unique structural credit enhancements and asset bundles disclosed herein free investors of the need to obtain a detailed understanding of the underlying assets, the disclosed embodiments may allow for such information to be automatically determined and updated from various sources, organized, and accessed by investors if they so desire.

And for DAC project developers, the securitization and management of CO2 offtakes provides increased availability of capital on better terms.

Although the embodiments are described herein in relation to CO2 offtakes, it will be appreciated that the embodiments are not necessarily limited thereto. Rather, the embodiments may be employed to manage complex transactions among any number of parties relating to individual or securitized assets or receivables of any type.

Detailed Flows

Referring to FIG. 1, an exemplary flow diagram is provided according to an embodiment. As shown, the embodiments may receive, determine and store information relating to any number of entities, such as a project company 101, an originator 102, a trust 103, a special purpose vehicle ("SPV") or issuer 104, offtakers 105, investors 106, credit card holders 107, merchants 108, a ratings agency 109, shareholders and sponsor 110, governments 111, and various funds 112. The embodiments may employ such information to facilitate and manage any number of transactions relating to complex financial instruments between/among such entities.

In one embodiment, a system may be provided to manage entity information relating to any number of project companies or developers 101 (e.g., CO2 sellers). Exemplary entity information may include, but is not limited to a unique entity ID, identification information (e.g., legal name, EIN, etc.), contact information (e.g., physical address, email address, phone number), shareholder information, management information, financials, relevant legal documents and contracts, etc.

In one particular embodiment, the system may manage information and transactions relating to any number of offtake agreements 121, each between a CO2 seller 101 and a CO2 purchaser or offtaker 105 who agrees to purchase an amount of CO2 141 at a specified price at one or more specified times. For example, the system may receive or determine offtake information for each offtake agreement comprising: a unique asset ID, terms and conditions of the offtake agreement 121, entity information corresponding to the offtaker 105 and any number of associated documents and agreements. As another example, the system may track the amount of CO2 141 received by an offtaker 105.

As discussed below, the system may manage and facilitate offtake payments 134. It will be appreciated that the system may receive and/or determine payment information for any number of payments, wherein such information may include: payment ID, asset ID, offtaker ID, invoice ID, payment amount, payment date, payment method, validation source(s), excess cashflow amount, and/or other notes.

In order to manage and facilitate securitization of CO2 offtakes, the system may provide functionality to allow a series of financial transactions to be consummated more or less simultaneously. As shown, a large number of CO2 offtake agreements 121 (each corresponding to an offtaker 105) may be aggregated, "bundled" or "pooled" into an offtake bundle 142 and transferred to a bankruptcy-remote SPV 104 through a sale or capital contribution (or combination of both) that constitutes a "true sale" or "absolute transfer" under federal bankruptcy law. It will be appreciated that, in some embodiments, an originator 102 may purchase the offtake agreements 121 from various entities (e.g., a CO2 developer/project company 101 or a third party) and/or may enter into one or more of the offtake agreements directly with various offtakers 105.

Concurrent with transfer of the asset bundle, the SPV 104 issues bonds or notes 144 to investors 106, where the notes have received a rating 124 by one or more independent rating agencies 109. Upon such issuance, the SPV 104 transfers the proceeds 132 from the sale of the notes 144 (after paying or reserving for closing expenses) to the originator 102, to pay some or all of the purchase price of the offtake bundle 142.

As discussed in detail below, the SPV 104 may create a hierarchical investor structure (e.g., tranches) from one or more offtake bundles 142, wherein the hierarchy corresponds to the order in which investors are paid in the case of a default. In any event, the bundled CO2 offtakes 142 may be transferred to a trust 103 that defines certain legal rights and obligations of the securitization, and also governs loss structures, cashflow waterfalls and other investor rights.

Throughout the life of each individual CO2 offtake 121, the system receives and distributes payments. For example, the system may allow for payments 134 from an offtaker 105 to be collected in a collections account 103 such that funds may be automatically routed to investors 106. As shown, the payment 134 may be transferred to the SPV, which distributes payments 137 to investors 106 according to a payment schedule associated with the notes 144.

It will be appreciated that the above described securitization of CO2 offtakes may involve either a static pool or a revolving pool. In a static pool, all or substantially all of the bundled offtakes 142 is identified, pledged, and transferred into the trust 103 at closing. In a revolving pool, the pool is replenished with new CO2 offtakes throughout a reinvestment period, as portfolio contracts are repaid or expire, or are sold or default.

One important attraction of the disclosed securitization structure is that it can achieve a higher credit rating 124 from rating agencies 109 than the underlying offtakes in the portfolio. Generally, one or more of the following credit enhancement techniques may be employed to increase this credit rating: excess spread, over-collateralization, tranches and/or reserve accounts.

In one embodiment, a reserve account (e.g., enhancement fund 112) may be created that contains funds 157 to cover unforeseen expenses, cost increases or cash flow problems. Generally, the reserve account mitigates the effects of temporary shortfalls and/or timing mismatches in cash flows from the CO2 offtakes and provides time to cure or mitigate interruptions or other issues presented by particular assets.

Figure 8:
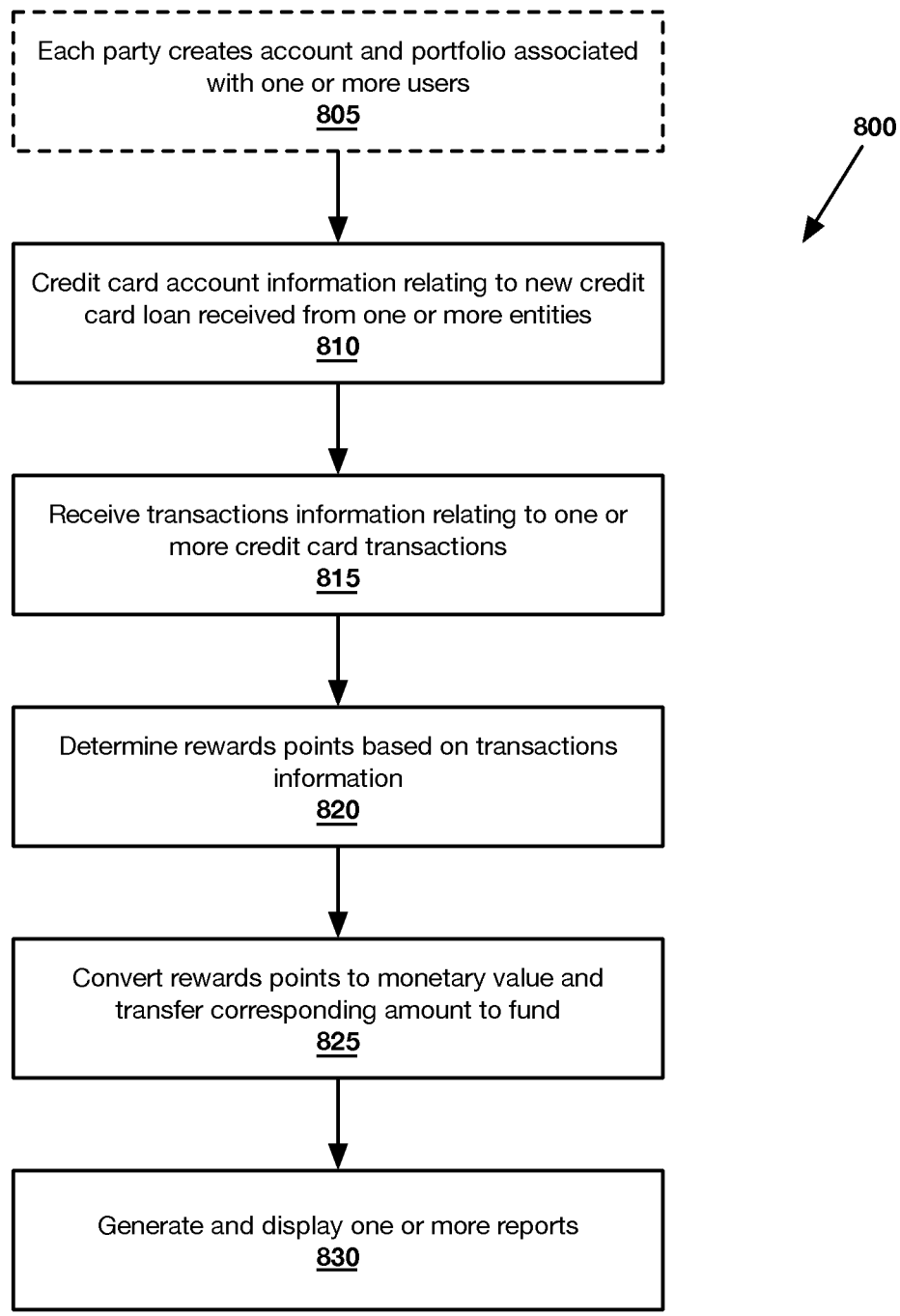
FIG. 8 shows an exemplary credit enhancement method 800 according to an embodiment.

As discussed in detail with respect to FIG. 8, in one preferred embodiment, a portion 156 of payments 152 received from credit card loans 151 between an originator 102 (or a different lender) and credit card holders 107 may be employed to fund one or more enhancement accounts 112. As shown, the system may manage and/or facilitate various credit card transactions among an originator 102, credit card holders 107, and merchants 108 (e.g., loan payments 152, purchases 153, and/or merchant payments 155). The system may further determine reward points based on any number of transaction-based rules, convert reward points to a monetary value, transfer a corresponding amount to the enhancement fund 112 and generate and display various reports linking such transfers to an amount of CO2 removed from the atmosphere. In another embodiment, proceeds from the credit card loans may be used to purchase CO2 offtakes from various holders such that the offtakes may be securitized.

In another embodiments, if the transaction is able to absorb the additional cost and still be economic, third-party credit enhancement (e.g., insurance) can be purchased for the benefit of the investors.

In certain embodiments, the systems manage information and facilitate transactions relating to tax credits 181 available from various governments 111. The system may determine and/or receive information from any number of sources to generate and submit reports necessary to receive tax credits. Moreover, the system may manage received tax credits 181 and automatically distribute the same 171 to various entities (e.g., shareholders and/or sponsors 110, lenders 102, investors 106, etc.) based on predetermined rules or logic.

As an example, two US policies were revised in 2018 to include provisions that explicitly support DAC: California's Low Carbon Fuel Standard ("LCFS") and the federal Section 45Q tax credit. These programs are not mutually exclusive. A DAC company can receive credit under multiple programs for the same project as long as all eligibility requirements are met, potentially increasing the total deployment support available.

The Section 45Q tax credit program provides a tax credit (the "45Q credit") associated with the sequestration or use of qualified carbon oxides ("CO"), including carbon dioxide. Section 45Q Credits may be sought for projects that commence construction prior to Jan. 1, 2024. Section 45Q Credits are calculated on the basis of volumes of CO sequestered during the 12-year period after qualifying carbon capture equipment is placed in service and qualified CO is disposed of in secure geologic storage or used. The source of the CO can either be from an industrial facility that produces CO or from a DAC facility, which captures CO directly from the ambient air.

The value of the 45Q Credit depends on whether the CO is sequestered in connection with use for enhanced oil or gas recovery. Starting in 2017, the credit was $22.66/ton for sequestered CO and $12.83/ton for CO that was used for enhanced oil or gas recovery. These amounts increase annually until 2026. From 2026 forward, the credit will be $50/ton for sequestered CO and $35/ton for CO that is used for enhanced oil or gas recovery (such amounts are increased annually by an inflation adjustment).

The tax credit is available only for "qualified CO" for a 12-year period after the "qualified facility" is placed in service. To be qualified CO, the CO must be: captured by equipment placed in service on or after Feb. 9, 2018; disposed of by the taxpayer in secure geological storage, unless used in certain specified manners (including growing algae or bacteria, conversion into a chemical compound or other purpose for which a commercial market exists); captured from an industrial source or, for direct air capture facilities, from the ambient air; and measured at the source of capture and verified at the point of disposal, injection, or utilization.

In order to be considered a "qualified facility," construction of a DAC facility must commence prior to Jan. 1, 2024. There are two ways to demonstrate that construction has begun—a physical work test and a five percent safe harbor test. The physical work test requires the taxpayer to commence physical work of a significant nature or enter into a binding written contract with a third party to commence such work. Additionally, a DAC must capture at least 100,000 metric tons of qualified CO during a given tax year to be considered a qualified facility.

Importantly, the program requires rigorous accounting of lifecycle greenhouse gas emissions. This requirement ensures DAC projects can be credited for net CO2 removed from the atmosphere.

It will be appreciated that the system may manage any/all of the above information in order to ensure a DAC project company receives all 45Q credits to which they are entitled.

California's Low Carbon Fuel Standard ("LCFS") program is a regulatory incentive program designed to encourage the use of cleaner, less carbon-intensive vehicle fuels. Under the LCFS program, each supplier of vehicle fuels in California is required to achieve a "benchmark" standard of "carbon intensity" of the fuels it supplies in the state. This standard represents greenhouse gas emissions associated with producing, distributing, and consuming a fuel, as measured in grams of CO2 equivalent per megajoule (gCO2e/MJ).

The LCFS program drives reductions in carbon intensity by requiring that fuels supplied by regulated entities in California, on average, meet the benchmark. In some cases, a regulated entity may achieve an average carbon intensity by purchasing LCFS credits. Such credits represent lifecycle greenhouse gas reductions in metric tons and, according to data compiled and published by the California Air Resource Board ("CARB"), average LCFS credit prices have risen from about $17 in 2012 to about $192 in 2019. Importantly, DAC facilities—even those located outside of California and/or those that do not have a fuel component—are eligible to generate LCFS credits.

The LCFS Regulation includes requirements for data accuracy and meter calibration. Reported LCFS data have financial implications and must meet the specified level of rigor. All entities that submit LCFS data used to calculate greenhouse gas emissions and reductions must attest to its accuracy.

In certain embodiments, the system may be employed to manage any/all of the above-discussed LCFS credits information and/or to automatically generate reports relating to the same.

Figure 2:
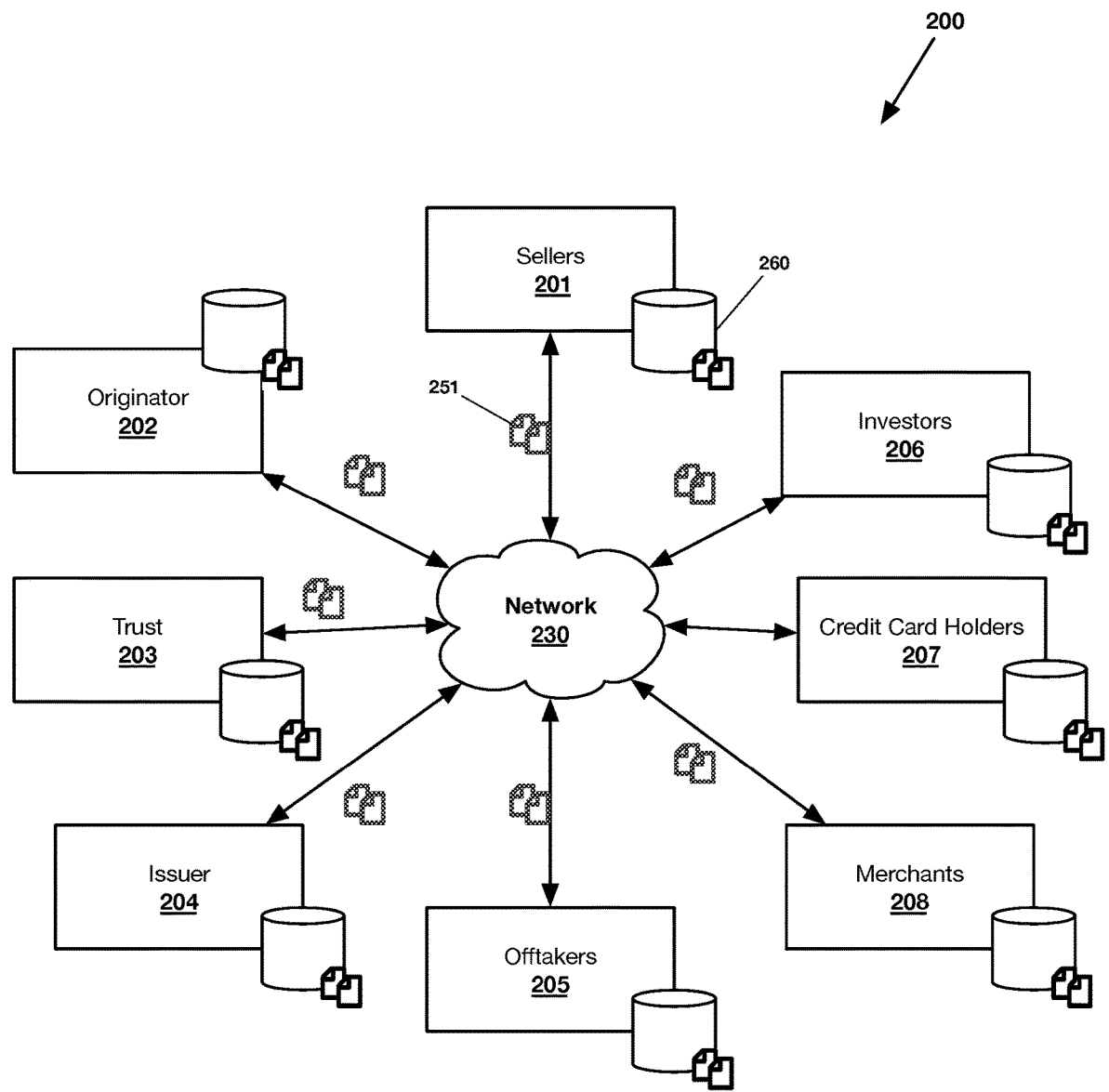
FIG. 2 shows an exemplary distributed ledger system 200 according to an embodiment.

Referring to FIG. 2, an exemplary distributed ledger system 200 according to an embodiment is illustrated. As shown, one or more distributed ledgers (e.g. blockchains) 251 are provided across a number of entities, such as a project company 201, an originator 202, a trust 203, an issuer 204, purchasers 205, investors 206, credit card holders 207, and merchants 208.

Generally, the entities 201-208 may store the distributed ledgers 251 on computing systems, which may be utilized in maintaining and/or updating the ledgers. Each entity may be configured for storing a version of the distributed ledger (or a portion thereof), and the distributed ledger may be updated from time to time with modifications to the ledger.

In some embodiments, the entities 201-208 include at least a decentralized set of computing devices and may even include personal computing devices for individuals, and so on. For example, a ledger 251 may be stored on a large number of publicly available devices, each acting as a "node" 260 for storing a copy of the ledger (e.g., being collaboratively maintained by anonymous peers on a network). In some embodiments, the ledger is only stored and maintained on a set of trusted nodes, such as the computing systems of authorized users. In other embodiments, a combination of both trusted nodes and public nodes may be utilized, with the same and/or different rules being applied to activities performed at each (e.g., the validation process may differ between trusted and untrusted nodes, or untrusted nodes may be prohibited from performing certain actions). And in yet other embodiments, there may be different levels of nodes with differing characteristics and applied business logic.

The ledgers, ledger entries, and/or information stored in the ledger entries may be used for records relating to various financial instruments. As use herein, a "financial instrument" or "instrument" refers to an agreement that gives rise to a financial asset of one entity and a financial liability or equity instrument of another entity. Exemplary financial instruments may include, but are not limited to: debt securities (e.g., debentures, bonds, deposits, notes, loans, commercial paper, corporate bonds, etc.), equity securities (e.g., stock), hybrid securities (e.g., preference shares, convertibles, equity warrants, etc.), foreign exchange instruments and/or others (e.g., repurchase agreements, tax credits, etc.).

In one embodiment, each ledger entry may include one or more of: instrument information, transaction information, history information and/or automated "smart contracts." Smart contracts are computer protocols or code intended to facilitate, verify and/or enforce the negotiation or performance of a contract.

As discussed below, there may be various rules and/or logic involved in activities relating to the ledger entries (e.g., creating, updating and/or validating). For example, a supermajority or a unanimous consent among entities may be enforced as a condition to a particular activity relating to an entry. Further, the ledger and ledger entries may utilize encryption technology to facilitate and/or validate digital signatures, for example, facilitating multi-signature documentation and ensuring the integrity of financial instrument records.

In some embodiments, the ledger 251 is publicly accessible. In other embodiments, the ledger is only accessible to select, authorized entities having appropriate permissions. In yet other embodiments, portions of the ledger are public and portions of the ledger are private. When the ledger is publicly accessible, the ledger may be adapted to only store information incidental to a transaction or a document relating to a financial instrument, and may be adapted such that identifiable information is removed while maintaining validation information (e.g., storing a hash value computed from the underlying information such that a ledger entry can be utilized to validate a specific financial system entry that is held as part of an organization's business records in relation to a contractual obligation). The instrument and transaction information stored on the ledger may be encrypted, redacted, compressed, and/or transformed (e.g., through a one-way transformation or a reversible transformation).

At various times, each of the entities 201-208 may store versions of the ledger 251, and the ledger may be maintained through the propagation of entries and/or updates that may be copied across ledgers. In some embodiments, distributed ledgers are utilized and the ledger entries are adapted to include various linkages to one another such that the integrity of the ledger entries can be reinforced and/or validated. For example, the linkages may include hashes computed based on prior entries in the ledger, which may be utilized to determine whether a ledger entry is a fraudulent entry by reviewing the correctness of the hash based on performing the hash on information stored on prior entries.

The ledger may be maintained through, for example, a distributed network system 230 providing decentralized control and storage of the ledger at the one or more entities 201-208, which may be considered nodes of the system 200. It will be appreciated that the number of nodes may be fixed or may vary over time.

In one embodiment, a blockchain ledger may be distributed across entities and used to track information relating to various agreements (e.g., assets, obligations, documents, etc.). The blockchain ledger may have entries linked to one another using cryptographic agreement records, and entries in the blockchain may be ordered, time stamped, and/or associated with metadata such that the blockchain is configured to provide protection from double transfers and unauthorized modification of ledger entries. In certain embodiments, once a transaction or entry is validated and recorded, it is immutable. In other embodiments, changes or deletions may require consensus by a plurality of authorized users.

As discussed above, a distributed ledger may maintain a CO2 offtake record that tracks offtake information and transactions (i.e., a history) linked to a unique asset ID. The transactions history is recorded in the distributed ledger via use of blocks, and each block includes the unique ID identifying the offtake. Accordingly, in one embodiment, the system may dynamically compile an offtake record by identifying and aggregating all blocks with the unique ID of a particular offtake. Generally, the system may store such information in a database and may make some or all of the offtake record available to authorized users by way of one or more user interface screens of client applications, an API, and/or via creation of digital reports that may be stored, printed and/or displayed.

Figure 3:
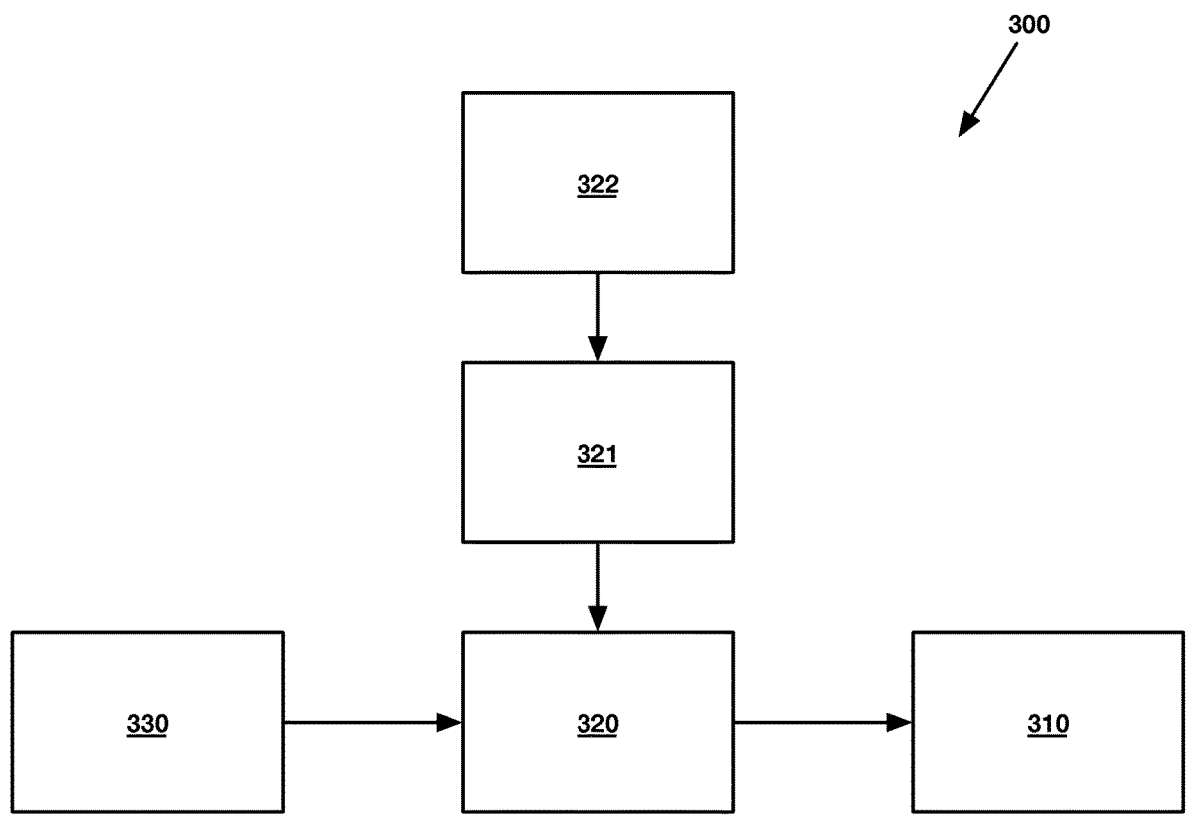
FIG. 3 shows an exemplary blockchain 300 comprising multiple blocks according to an embodiment.

Referring to FIG. 3, an exemplary blockchain 300 according to an embodiment is illustrated. As shown, block 310, block 320, and block 330 provide a record relating to a particular object, such as a CO2 offtake or an entity. As an example, block 320 can have different versions or updates, such as block 321 and block 322.

In some embodiments, each block includes a unique object ID along with corresponding object information and/or transaction information. Each block also includes a timestamp indicating when the block was created. And, if there is more than one block in the blockchain, each block beyond the first may further include a hash of a previous block in the blockchain.

Generally, object information may comprise any of the entity information, agreement information and/or offtake information discussed above. And transaction information may comprise, for example, the nature of the transaction, parties to the transaction, document sections, contractual clauses, version information, status of the transaction (e.g., pending, validated, signed), transaction amount, transaction date, and/or electronic representatives or derivatives of the same.

In one embodiment, an object record may be made up of a set of blocks (e.g. block 310, block 320, block 330) with data relating to a single object. Each block for a particular object record can include the same unique object ID and different object records are provided by different sets of blocks that include different object IDs. Such records may be maintained using blocks organized in blockchains stored in blockchain storage of entities (e.g., FIG. 2 at 260).

The blocks may be connected to one another through various linkages, for example, each linkage may be formed based on a hash computed from part or all of a previous block or a portion thereof (e.g., unique object ID). For example, block 310 may be the initial or "genesis" block and block 320 may be connected to block 310 and include a hash computed from the object ID of block 310. There may be various versions of blocks, for example, block 321 and block 322, which may be updated and/or modified versions of object or transaction information stored in block 320. Other implementations, topologies and/or arrangements may be provided.

Generally, entities can be granted permission attributes or access to write new blocks to the blockchain and/or update object records with different transactions and events relating to the object. For example, a new block can indicate that a payment was received for a particular CO2 offtake agreement object.

Access to write new blocks for an object record can be restricted to certain authorized entities. An authorized entity can be verified before writing new blocks for an object record. In certain embodiments, a block of the object record may include a smart contract for a transaction relating to the object such that the transaction may only be executed and recorded to the blockchain when certain conditions are met.

In some embodiments, when an entity writes a block to an existing object record, any of the other entities associated with the object may be notified by way of a notification message (e.g., an email, text message, or push notification via a client application).

Figure 4:
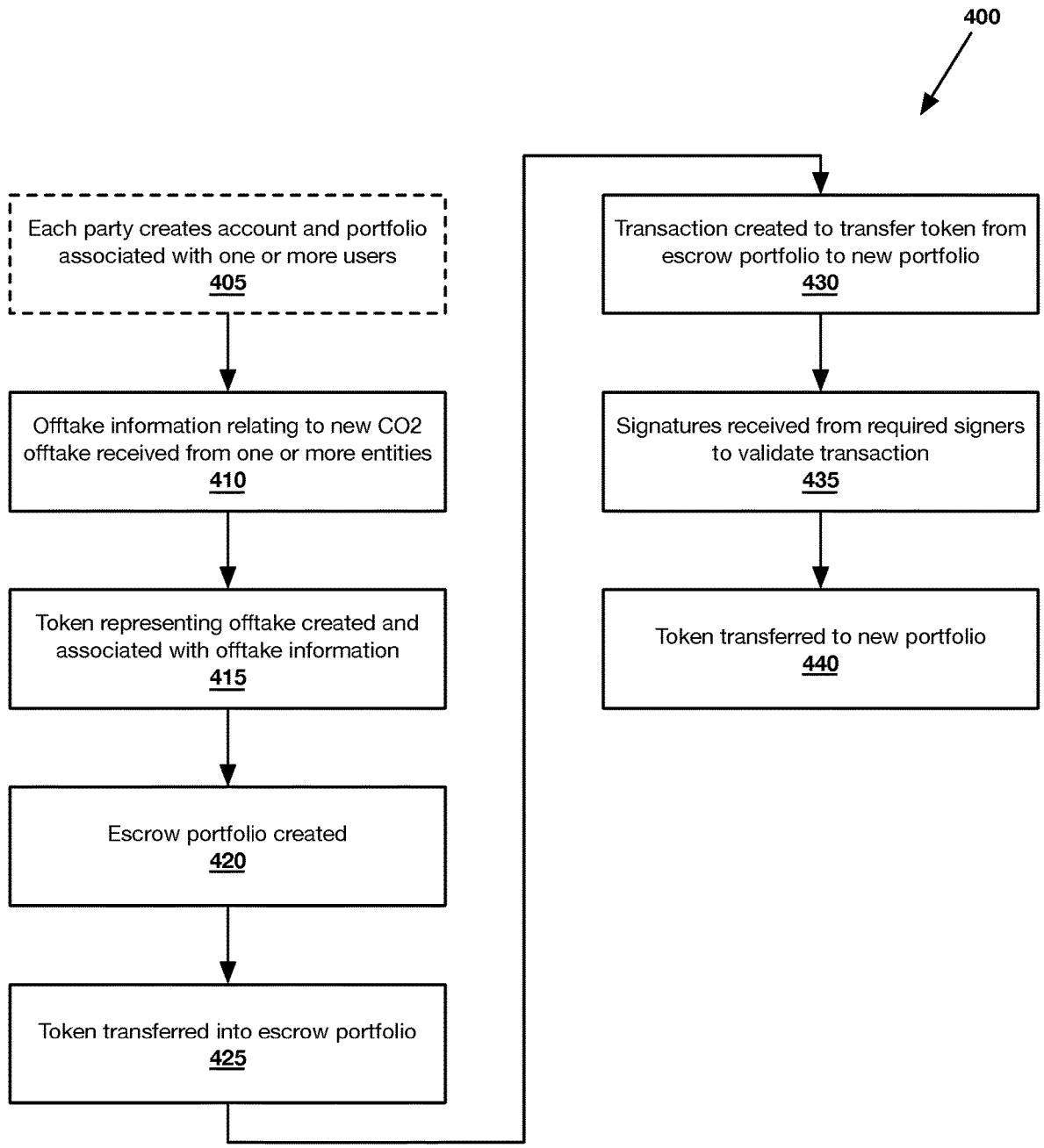
FIG. 4 shows an exemplary asset token creation method 400 according to an embodiment.

Referring to FIG. 4, an exemplary method 400 of creating a CO2 offtake token is illustrated. As shown, the method may begin at optional step 405, where various entities may create an account, associate one or more authorized users with the account, create a distributed ledger portfolio and/or associate one or more users with the portfolio. Exemplary entities may include: an originator, an issuer, a trust, an investor, an offtaker, a validator, etc.

Generally, each of the parties involved in a financial instrument must create an account to interact with the system. An account may be associated with one or more authorized users, each of which may be further associated with various levels of access to the system. For example, a user associated with an originator's account may be permitted to view and update the account's profile information. As another example, an issuer user may be permitted to view offtake information relating to securitized offtakes associated with the issuer's account.

In order to hold, receive and/or transfer the digital assets discussed herein, each party may need to be associated with a distributed ledger portfolio (e.g., a digital wallet). It will be appreciated that a single account (e.g., an originator account) may be associated with one or more portfolios, and one or more users associated with an account may be granted access to view, create, update, and/or delete one or more of such portfolios.

For example, a first user associated with an originator account may have permission to sign transactions relating to digital assets held in a first portfolio of the originator account, but may not have any permissions with respect to a second portfolio. Accordingly, such user is an "authorized user" with respect to the originator account and the first portfolio, but is not an authorized user with respect to the second portfolio.

At step 410, offtake information relating to a new CO2 offtake is received and/or determined by the system. In addition to the above-listed offtake information, offtake information may further comprise portfolio information relating to portfolios associated with relevant parties to the offtake. For example, the portfolio information may specify: an originator portfolio and an offtaker portfolio. Generally, each of the portfolios included in the portfolio information may be represented by a unique portfolio ID, such as a digital wallet address.

At step 415, an offtake token representing the new CO2 offtake agreement is created and associated with the received/determined offtake information. As discussed in detail below, such offtake tokens may be tracked and traded on a distributed ledger, such as the blockchain, and the token and underlying offtake agreement may trade together until the offtake agreement terminates.

At step 420, an escrow portfolio is created and, at step 425, the offtake token is stored in the escrow portfolio. Generally, an escrow portfolio may be required to hold the offtake token and/or payments for a predetermined amount of time or during pendency of offtake agreements and/or finalization of offtake documents.

Depending on the offtake information associated with the new offtake, the escrow portfolio may be designed such that any transactions relating to offtake tokens stored therein must be signed/validated by various required signers. For example, at origination, various parties must all agree upon existence of the offtake, existence of the offtake purchase agreement, accuracy of offtake information provided to the system, disbursement of funding, etc.

In any event, once the escrow portfolio has been created, the initial offtake token transfer has taken place into the escrow portfolio, and signers have been added to the escrow account, a transaction may be created at step 430 to validate the offtake and transfer the token from the escrow portfolio to the associated originator's portfolio.

At step 435, a signature is received from each of the required escrow signers and the token transfer transaction is validated. And, at step 440, the validator may sign the transaction, moving the offtake token from the escrow account into the assigned originator portfolio account. In certain embodiments, the escrow signers may need to sign the transaction in a specific order.

It will be appreciated that, in some embodiments, an escrow portfolio may not be required. In such embodiments, the token may be directly transferred to the originator portfolio (step 445) after it is created and associated with originator information (step 415).

Figure 5:
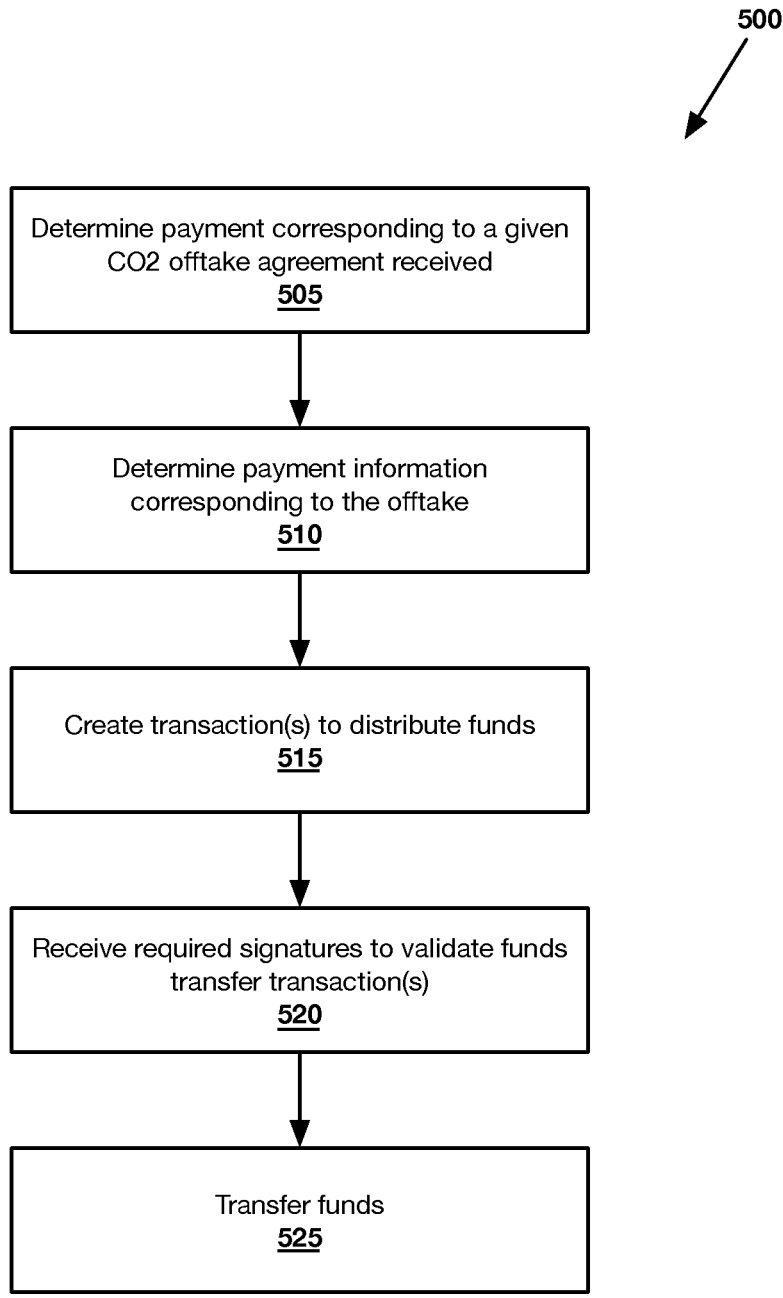
FIG. 5 shows an exemplary method 500 of receiving offtake payments and distributing funds to various entities.

Referring to FIG. 5, an exemplary method 500 of receiving and distributing payments is illustrated.

At step 505, the system may determine that a payment corresponding to a particular CO2 offtake agreement managed by the system (i.e., an offtake represented by an offtake token) has been received. In one embodiment, a user (e.g., an offtaker) may make a payment by signing into a client application and creating a transaction to transfer payment relating to an asset ID on the blockchain. The system may automatically determine the asset ID if the user is associated with only one. In embodiments where the user is associated with more than one asset ID, the user may manually select or input the asset ID that the transfer pertains to. In other embodiments, the user may link his account to a bank account or other payment account and authorize automatic payments according to the relevant agreement(s).

In one embodiment, the system may automatically determine that a payment has been made via a notification of a new transaction created relating to a specific asset ID. In other embodiments, the payor may be associated with a public key, allowing the system to identify previous transactions and determine, based on logic rules, which asset the payment is associated with. Additionally or alternatively, the system may automatically create scheduled dates for when each payment is expected, and may determine whether the payor has transferred payment at that time. In yet other embodiments, one or more authorized users may be notified by the system of the transaction to transfer payment. Additionally or alternatively, the one or more authorized users may manually look up transactions relating to the asset ID.

Upon determining that a payment has been received for a particular CO2 offtake agreement, the system may determine payment information corresponding to investors who have invested in an asset bundle that includes the offtake agreement 510. In one embodiment, the system may use the unique asset ID associated with a payment to locate the corresponding offtake record in the distributed ledger. And the system may then parse the offtake record (i.e., each block associated with the asset ID) to determine ownership information.

At step 515, one or more transactions are created to appropriately distribute the received payment to investors. At step 520, the fund transfer transaction(s) may be validated and signed by authorized signers and recorded. And, at step 525, the system transfers funds to the investors.

In one embodiment, the system may transmit one or more notifications during the above-described process. For example, the system may transmit payment reminders to offtakers at predetermined times before payments are due. As another example, the system may transmit successful payment notifications to offtakers and/or token owners upon determining that a payment has been received. And, as yet another example, the system may transmit a notification to a party (e.g., an investor) upon transferring a payment to the party. In certain embodiments, the system may determine most, if not all, aspects of such transactions and related documentation, without the need for trustee involvement.

Figure 6:
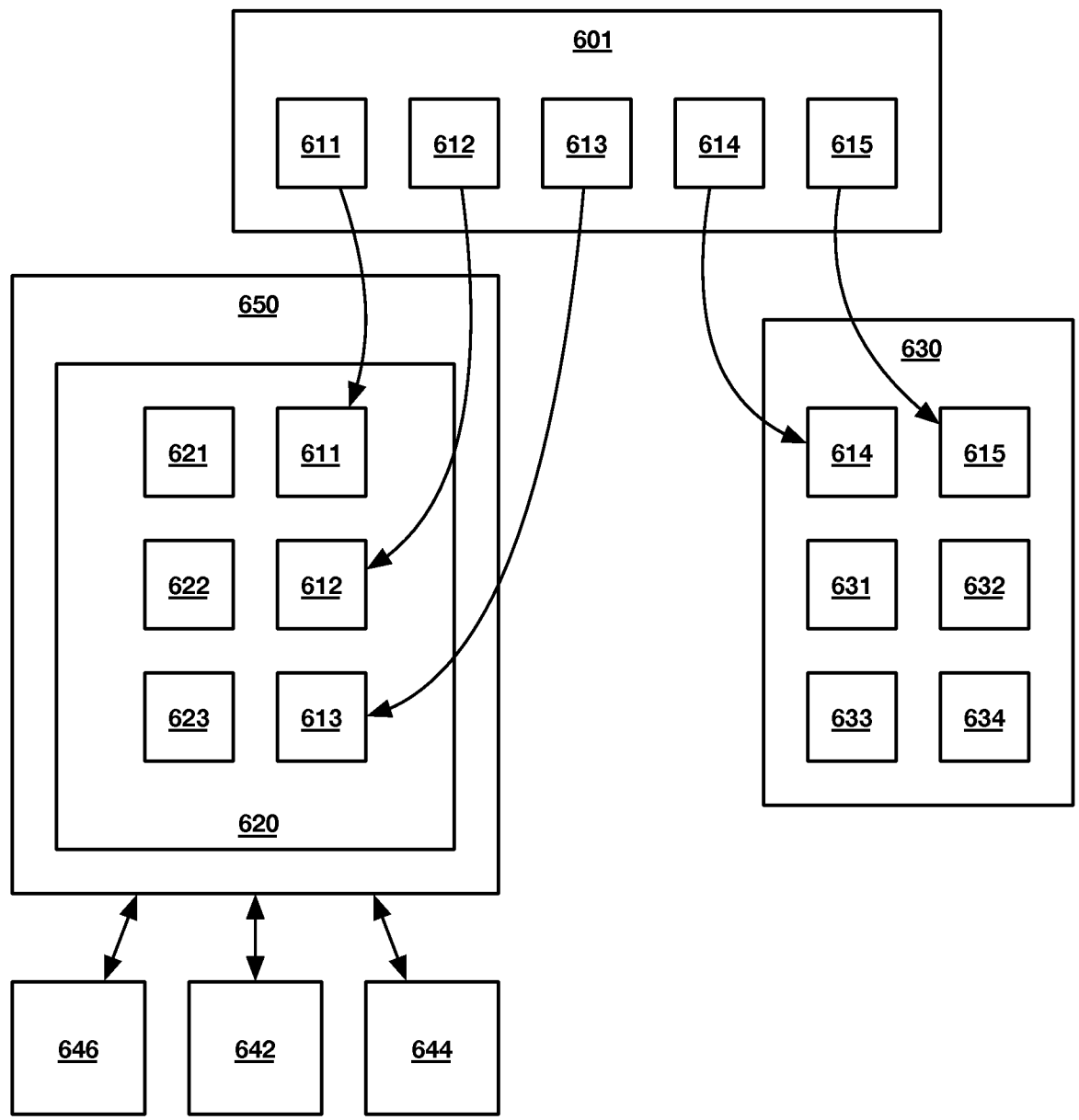
FIG. 6 shows an exemplary ownership structure according to an embodiment.

Referring to FIG. 6, a block diagram showing an exemplary offtake token ownership structure is illustrated. As shown, an originator 601 may be associated with a plurality of offtake tokens 611-615, each representing a single CO2 offtake agreement.

In some embodiments, offtake tokens 611-615 may be aggregated into one or more token bundles 620, 630. For example, offtake tokens 611-613 are associated with a first bundle 620 and offtake tokens 614 and 615 are associated with a second bundle 630. Generally, each of the bundles 620, 630 may include any number of offtake tokens (e.g., 621-623 and 631-634). It will be appreciated that each bundle 620, 630 may comprise bundle attributes corresponding to the attributes of the offtake tokens contained within the pool. Importantly, bundling large amounts of offtakes confers the benefits of the law of large numbers, under which uncertainty and risk decrease (by the law of large numbers) without an attendant increase on payment or prices.

As further shown in FIG. 6, any number of the offtake tokens 611-615 and/or token bundles 620 may be transferred from one entity (e.g., an originator) 601 to another entity (e.g., an issuer or trust) 650. In certain embodiments, each bundle 620 may be associated with a single ownership structure (e.g., a trust) 650, which allows for a number of investors 642, 644, 646 to invest in the structure.

In one embodiment, a hierarchical investor structure may be employed wherein the hierarchy corresponds to the order in which investors are paid in the case of a default. For example, senior investors 642 may have top priority in receiving payment in the case of a default, then mezzanine investors 644, and finally, subordinate investors 646. Accordingly, the hierarchical structure may provide different risk/reward levels to investors. Moreover, by utilizing such ownership structures, the system allows for payments to be efficiently disbursed among among investors in a pool and/or a trust.

Figure 7:
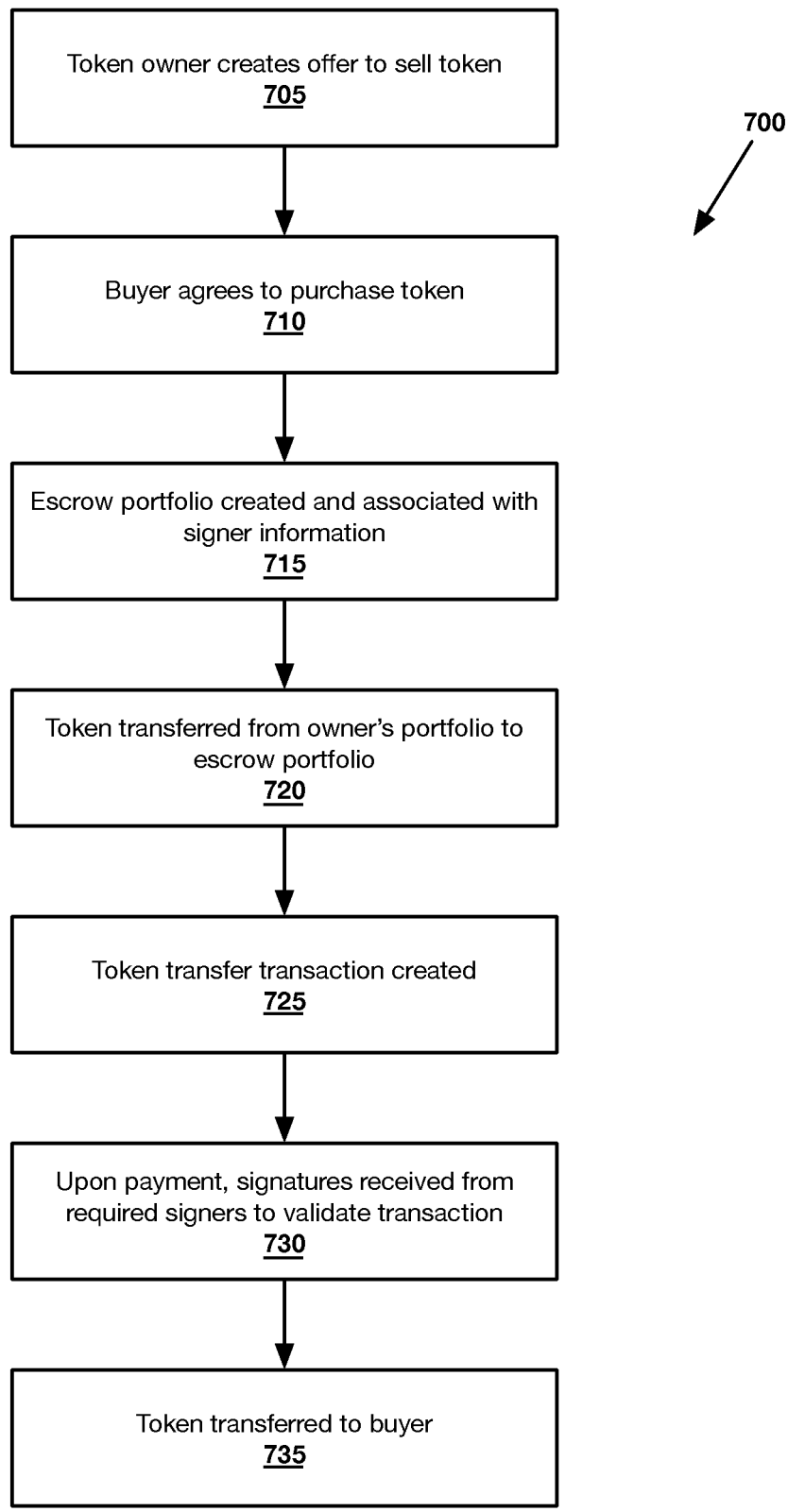
FIG. 7 shows an exemplary method 700 of transferring asset tokens according to an embodiment.

Referring to FIG. 7, an exemplary method 700 of transferring a token is illustrated. It will be appreciated that the following discussion pertains to any transfer of a token from one entity to another. For example, an originator may transfer an offtake token (or a bundle of offtake tokens) to an issuer. As another example, the issuer may transfer a note token to an investor.

At step 705, a token owner creates an offer to sell the token (or a bundle of tokens). And at step 710, an investor agrees to purchase the token(s).

At step 715, an escrow portfolio is created and associated with signer information, as described above. At step 720, the one or more tokens is transferred from the token owner's portfolio to an escrow portfolio, to which escrow signers are added. In one embodiment, the investor portfolio is added as signers to the escrow account.

At step 725, a transaction is created to transfer the token(s) from the escrow account to the new portfolio. At step 730, the transaction requires signatures from both the token owner's portfolio and the investor's portfolio. At step 735, funds are transferred to the token owner's portfolio, a validator confirms receipt of funds by the token owner, and the one or more tokens is transferred to the investor's portfolio. The token owner's portfolio may then be removed as a signer on the escrow account to prevent bad actor activity.

Referring to FIG. 8, an exemplary method 800 of utilizing credit card loan proceeds for credit enhancement of securitized CO2 offtake agreements is illustrated. As shown, the method may begin at optional step 805, where various entities create an account and associate one or more authorized users with the account. Exemplary entities may include a lender, credit card holders, merchants and one or more credit enhancement funds.

At step 810, loan information relating to a new credit card loan is received and/or determined by the system. And at step 815, credit card transaction information is received and/or determined by the system. Exemplary transaction information may include, but is not limited to, transaction amount, transaction type, originating account identifier, counterparty account identifier, and a merchant identifier.

Generally, a credit card holder may utilize the system by accessing products (e.g., credit cards, mobile wallets) through any number of channels (e.g., point of sale devices, ATMs, terminals). Accordingly, the system may be configured to receive various forms of transactions, such as bill payments, purchasing transactions, payments, etc., and calculate rewards points in conjunction with, or in relation with the transactions.

In some embodiments, a blockchain implementation is employed wherein digital tokens are stored on a series of decentralized nodes each having a copy of a distributed ledger managed in accordance with electronic propagation mechanisms that are used to validate and verify transactions/activities that relate to credit card transactions (e.g., consensus mechanisms used to effect state transitions in relation to the updating of the nodes such that the distributed ledgers contain the same entries across the decentralized network).

The distributed ledger system may be configured to allow the credit card holder to earn and view rewards points in real time, automatically reconcile points across consumer and merchant accounts, integrate with key management solutions to allow for public/private keys management, and integrate with various internal and external systems for merchant reconciliation. In some embodiments, reconciliation with merchants may not be required, as merchants are participants in the system and the blockchain ledger validates transactions across participants.

As discussed above with respect to FIG. 2, the distributed ledger may be one or more cryptographically linked chains of sequential entries, each of the cryptographically linked chains relating to one or more digital tokens, or groups (blocks) of digital tokens that may have associated data payloads, such as value, quantity, conditions, object, etc.

Different types of digital tokens may be stored on different cryptographically linked chains, but may be adapted such that consensus rules permit for cross-token-type transactions by way of a conversion process. Corresponding transactions may be effected on the distributed ledgers to correspondingly create/transfer digital tokens, establishing new chains or ending existing chains in accordance with conversion processes/logical conditions (e.g., conversion rate, pre-conditions, bonuses applied).

In any event, at step 815, the system may apply various logical rules (e.g., soft coded or hard coded, relative or absolute), conditions, and/or triggers that determine when an event has taken place, and may award and/or otherwise provision reward points based on various conversion rules.

For example, reward points may be granted and associated with a credit card holder's account based on: particular transactions (e.g., 10,000 points for opening an account, 500 points for annual renewal, 1 point per purchase, etc.); total amount spent (e.g., 1 point for every dollar); amount spent on particular types of goods and services (e.g., 1 point for every dollar spent on gas, 2 points for every dollar spent on electronics); rounding (e.g., 0.05 points for a $0.95 transaction); and/or spending at least a minimum amount within a predetermined time (e.g., 1,000 points for spending at least $500 within the first 60 days of opening an account). In one embodiment, reward points may be granted based on a percentage of interchange fee income—the percentage of each credit card transaction that lenders charge merchants.

In one embodiment blocks in the blockchain may be configured such that conversion rules/consensus rules are also stored directly on the distributed ledgers and obtained via querying the distributed ledger by the one or more nodes. The provisioning of "piggybacked" rules allows for an easy propagation of rule changes, which is otherwise difficult due to the lack of a centralized control authority where conversion rules are read from. Accordingly, in some embodiments, the distributed ledger may include one or more side chains wherein conversion rules are maintained similar to processed transactions (e.g., modifications are applied not to change the rules on the chain, but rather, added as sequential blocks which are read to determine the most current conversion rule).

At step 825, the system determines a monetary value of the rewards points and transfers a corresponding payment to a fund associated with CO2 offtake agreements (e.g., a fund employed to acquire CO2 offtakes and/or a fund employed for credit enhancement of securitized CO2 offtakes). In one embodiment, the reward points may be converted to a particular currency (e.g., USD) and a payment in such currency may be electronically transferred to the fund. In another embodiment, rewards points may be stored in and/or converted to a digital currency (as provided and supported by a blockchain) before and/or as part of subsequent conversions and transfers.

In one embodiment, the system may generate, provision, process, and or provide reports relative to the records stored on the distributed ledger 830. Generally, the system may provide various portals and/or access tools (e.g., through a display, a user interface, a web interface, an application programming interface, etc.) so that users may access various functionality associated with the distributed ledger. For example, the system may allow credit card holders to view various information relating to their account (e.g., transactions information, balance, payments, interest rate and personal information).

Importantly, the system may calculate and display reward points information to credit card holders. As an example, the system may display a number of reward points earned, details relating to how each of the reward points was earned, and information pertaining to use of the rewards points.

In embodiments where rewards points are converted to funds invested in CO2 offtake-related investments, the system may perform various calculations to convert the number of rewards points earned by a credit card holder to an amount of CO2 removed from the atmosphere. Such information may be provided to the user via one or more reports displayed on a user interface.

In some embodiments, this arrangement, or one or more parties to it, may include or derive benefit from laws, rules or regulations, such as, for example, Federal Law 45Q, which 2018 law offers $35 tax credit per ton of CO2 removed from the atmosphere. In some embodiments, for example, the user of the credit card benefits financially from the decrease in interest or interest payments caused by the application of the 45Q law, according to a predetermined formula. In some embodiments, depending on the amounts recorded, there can be a reimbursement to the user on the interest paid on unpaid balances. In some embodiments, the reimbursement could even make the interest payments negative, so the user can be paid based on using the credit card in order to make everyday purchases, effectively decreasing the cost of purchases and possibly making net payments to the user on the card's purchases.

Figure 9:
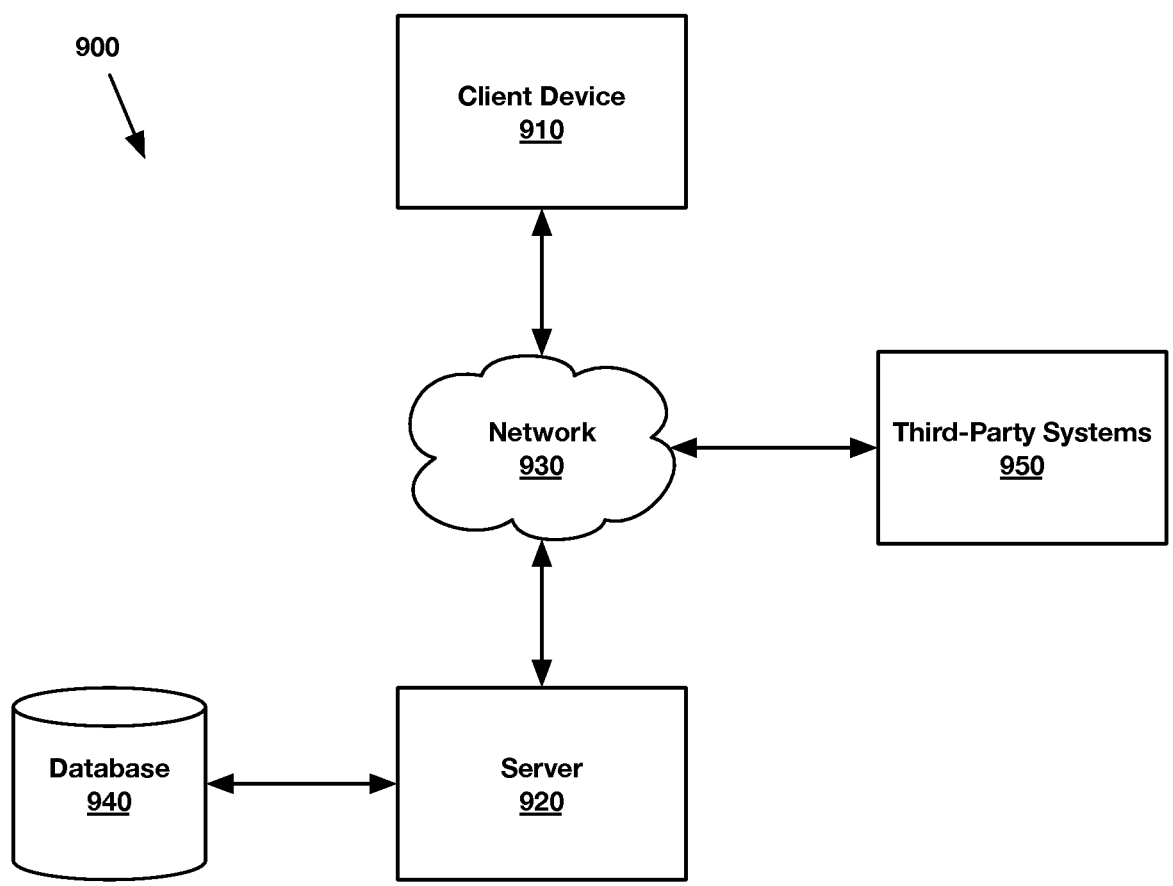
FIG. 9 shows an exemplary system 900 according to an embodiment.

Referring to FIG. 9, a block diagram of an exemplary system 900 according to an embodiment is illustrated. As shown, the system comprises any number of users accessing a server 920 via a network 930. In certain embodiments, a user may access the server 920 via a client device 910 connected to the network 930.

Generally, a client device 910 may be any device capable of running a client application and/or of accessing the server 920 (e.g., via the client application or via a web browser). Exemplary client devices 910 may include general purpose desktop computers, laptop computers, smartphones, and/or tablets.

The relationship of client 910 and server 920 arises by virtue of computer programs running on the respective computers and having a client-server relationship to each other. Accordingly, each of the client devices 910 may have a client application running thereon, where the client application may be adapted to communicate with a server application running on a server 920, for example, over a network 930. Thus, the client application and server 920 may be remote from each other. Such a configuration may allow users of client applications to input information and/or interact with the server from any location.

As discussed above, a client application may be adapted to present various user interfaces to users. Such user interfaces may be based on information stored on the client device 910 and/or received from the server 920. Accordingly, the client application may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code).

In certain embodiments, the server 920 and/or the client device 910 may be adapted to receive, determine, record and/or transmit application information. The application information may be received from and/or transmitted to the client application. Moreover, any of such application information may be stored in and/or retrieved from one or more local or remote databases (e.g., database 940).

In one embodiment, the server 920 may be connected to one or more third-party systems 950 via the network 930. Third-party systems 950 may store information in one or more databases that may be accessed by the server. Exemplary third-party systems may include, but are not limited to: distributed ledger systems, cryptocurrency systems, payment and billing systems, messaging systems, cloud-based storage and backup systems, financial systems and others. The server 920 may be capable of retrieving and/or storing information from third-party systems 950, with or without user interaction. Moreover, the server may be capable of transmitting stored information to third-party systems.

Figure 10:
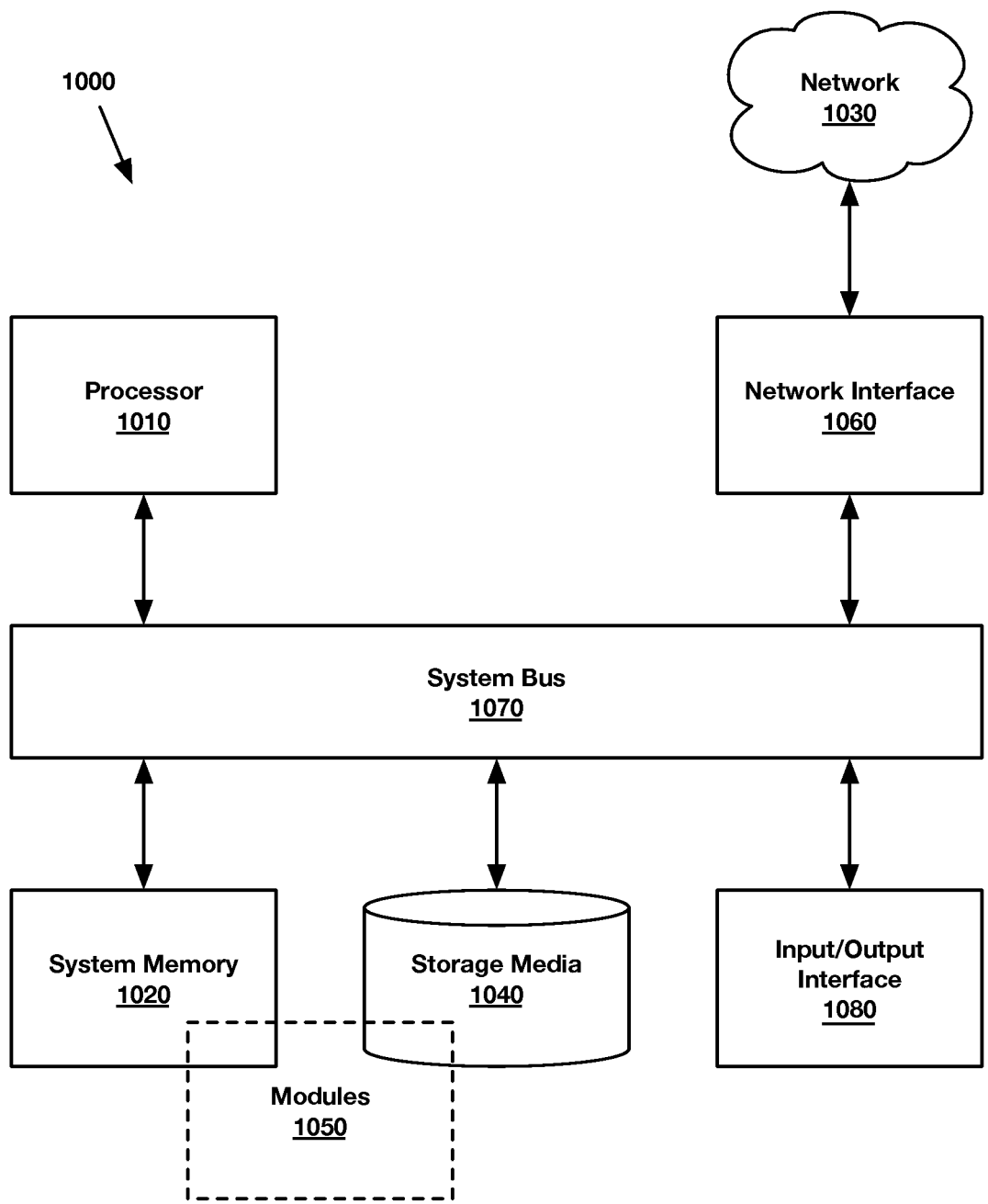
FIG. 10 shows an exemplary computing machine 1000 and modules 1050 according to an embodiment.

Referring to FIG. 10, a block diagram is provided illustrating a computing machine 1000 and modules 1050 in accordance with one or more embodiments presented herein. The computing machine 1000 may correspond to any of the various computers, servers, mobile devices, embedded systems, or computing systems presented herein (e.g., the client device(s) 910, server(s) 920, and/or third-party system(s) 950 of FIG. 9). The modules 1050 may comprise one or more hardware or software elements configured to facilitate the computing machine 1000 in performing the various methods and processing functions presented herein.

The computing machine 1000 may comprise all kinds of apparatuses, devices, and machines for processing data, including but not limited to, a programmable processor, a computer, and/or multiple processors or computers. As shown, an exemplary computing machine 1000 may include various internal and/or attached components, such as a processor 1010, system bus 1070, system memory 1020, storage media 1040, input/output interface 1080, and network interface 1060 for communicating with a network 1030.

The computing machine 1000 may be implemented as a conventional computer system, an embedded controller, a laptop, a server, a mobile device, a smartphone, a kiosk, one more processors associated with a display, a customized machine, any other hardware platform and/or combinations thereof. Moreover, a computing machine may be embedded in another device, such as a smartphone, a tablet, a mobile audio or video player, a game console, or a portable storage device (e.g., a universal serial bus ("USB") flash drive). In some embodiments, the computing machine 1000 may be a distributed system configured to function using multiple computing machines interconnected via a data network or system bus 1070.

The processor 1010 may be configured to execute code or instructions to perform the operations and functionality described herein, manage request flow and address mappings, and to perform calculations and generate commands. The processor 1010 may be configured to monitor and control the operation of the components in the computing machine 1000. The processor 1010 may be a general-purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 1010 may be a single processing unit, multiple processing units, a single processing core, multiple processing cores, special purpose processing cores, coprocessors, or any combination thereof. In addition to hardware, exemplary apparatuses may comprise code that creates an execution environment for the computer program (e.g., code that constitutes one or more of: processor firmware, a protocol stack, a database management system, an operating system, and a combination thereof). According to certain embodiments, the processor 1010 and/or other components of the computing machine 1000 may be a virtualized computing machine executing within one or more other computing machines.

The system memory 1020 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 1020 also may include volatile memories, such as random-access memory ("RAM"), static random-access memory ("SRAM"), dynamic random-access memory ("DRAM"), and synchronous dynamic random-access memory ("SDRAM"). Other types of RAM also may be used to implement the system memory. The system memory 1020 may be implemented using a single memory module or multiple memory modules. While the system memory is depicted as being part of the computing machine 1000, one skilled in the art will recognize that the system memory may be separate from the computing machine without departing from the scope of the subject technology. It should also be appreciated that the system memory may include, or operate in conjunction with, a non-volatile storage device such as the storage media 1040.

The storage media 1040 may include a hard disk, a compact disc read only memory ("CD-ROM"), a digital versatile disc ("DVD"), a Blu-ray disc, a magnetic tape, a flash memory, other non-volatile memory device, a solid-state drive ("SSD"), any magnetic storage device, any optical storage device, any electrical storage device, any semiconductor storage device, any physical-based storage device, any other data storage device, or any combination or multiplicity thereof. The storage media 1040 may store one or more operating systems, application programs and program modules such as module, data, or any other information. The storage media may be part of, or connected to, the computing machine 1000. The storage media may also be part of one or more other computing machines that are in communication with the computing machine such as servers, database servers, cloud storage, network attached storage, and so forth.

The modules 1050 may comprise one or more hardware or software elements configured to facilitate the computing machine 1000 with performing the various methods and processing functions presented herein. The modules 1050 may include one or more sequences of instructions stored as software or firmware in association with the system memory 1020, the storage media 1040, or both. The storage media 1040 may therefore represent examples of machine or computer readable media on which instructions or code may be stored for execution by the processor. Machine or computer readable media may generally refer to any medium or media used to provide instructions to the processor. Such machine or computer readable media associated with the modules may comprise a computer software product. It should be appreciated that a computer software product comprising the modules may also be associated with one or more processes or methods for delivering the module to the computing machine via the network, any signal-bearing medium, or any other communication or delivery technology. The modules 1050 may also comprise hardware circuits or information for configuring hardware circuits such as microcode or configuration information for an FPGA or other PLD.

The input/output ("I/O") interface 1080 may be configured to couple to one or more external devices, to receive data from the one or more external devices, and to send data to the one or more external devices. Such external devices along with the various internal devices may also be known as peripheral devices. The I/O interface 1080 may include both electrical and physical connections for operably coupling the various peripheral devices to the computing machine 1000 or the processor 1010. The I/O interface 1080 may be configured to communicate data, addresses, and control signals between the peripheral devices, the computing machine, or the processor. The I/O interface 1080 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, Fire-Wire, various video buses, and the like. The I/O interface may be configured to implement only one interface or bus technology. Alternatively, the I/O interface may be configured to implement multiple interfaces or bus technologies. The I/O interface may be configured as part of, all of, or to operate in conjunction with, the system bus 1070. The I/O interface 1080 may include one or more buffers for buffering transmissions between one or more external devices, internal devices, the computing machine 1000, or the processor 1010.

The I/O interface 1080 may couple the computing machine 1000 to various input devices including mice, touch-screens, scanners, biometric readers, electronic digitizers, sensors, receivers, touchpads, trackballs, cameras, microphones, keyboards, any other pointing devices, or any combinations thereof. When coupled to the computing device, such input devices may receive input from a user in any form, including acoustic, speech, visual, or tactile input.

The I/O interface 1080 may couple the computing machine 1000 to various output devices such that feedback may be provided to a user via any form of sensory feedback (e.g., visual feedback, auditory feedback, or tactile feedback). For example, a computing device can interact with a user by sending documents to and receiving documents from a device that is used by the user (e.g., by sending web pages to a web browser on a user's client device in response to requests received from the web browser). Exemplary output devices may include, but are not limited to, displays, speakers, printers, tactile feedback devices, automation control, actuators, transmitters, signal emitters, lights, and so forth. And exemplary displays include, but are not limited to, one or more of: projectors, cathode ray tube ("CRT") monitors, liquid crystal displays ("LCD"), light-emitting diode ("LED") monitors and/or organic light-emitting diode ("OLED") monitors.

Embodiments of the subject matter described in this specification can be implemented in a computing machine 1000 that includes one or more of the following components: a backend component (e.g., a data server); a middleware component (e.g., an application server); a frontend component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network.

Accordingly, the computing machine 1000 may operate in a networked environment using logical connections through the network interface 1060 to one or more other systems or computing machines across the network 1030. The network 1030 may include wide area networks ("WAN"), local area networks ("LAN"), intranets, the Internet, wireless access networks, wired networks, mobile networks, telephone networks, optical networks, or combinations thereof. The network 1030 may be packet switched, circuit switched, of any topology, and may use any communication protocol. Communication links within the network 1030 may involve various digital or an analog communication media such as fiber optic cables, free-space optics, waveguides, electrical conductors, wireless links, antennas, radio-frequency communications, and so forth.

The processor 1010 may be connected to the other elements of the computing machine 1000 or the various peripherals discussed herein through the system bus 1070. It should be appreciated that the system bus 1070 may be within the processor, outside the processor, or both. According to some embodiments, any of the processor 1010, the other elements of the computing machine 1000, or the various peripherals discussed herein may be integrated into a single device such as a system on chip ("SOC"), system on package ("SOP"), or ASIC device.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references, including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A method comprising:
    receiving offtake information for each of a plurality of offtake agreements, the offtake information comprising:
        purchaser information relating to a purchaser associated with the respective offtake agreement;
        an amount of carbon dioxide ("CO2") to be purchased by the purchaser at one or more times during a term of the respective offtake agreement; and
        a price to be paid by the purchaser for the amount of CO2;
    creating a plurality of digital offtake tokens, each digital offtake token respectively representing one of the plurality of offtake agreements;
    storing at least one of the digital offtake tokens on a distributed ledger system;
    associating each of the offtake tokens with an originator portfolio relating to an originator and associated with the distributed ledger system to thereby create a bundle of offtake tokens;
    storing on the distributed ledger one or more side chains comprising conversion/consensus rules governing the offtake token transaction;
    propagating any change to the conversion/consensus rules by adding blocks to the side chains with modifications to such conversion/consensus rules;
    identifying and aggregating information stored on the distributed ledger system and associated with a unique asset ID of one of the offtake agreements;
    dynamically compiling a digital offtake record having historical information respectively associated with at least one of the offtake agreements;
    storing on the distributed ledger system the digital offtake record;
    providing access to at least some of the digital offset record via a graphical user interface to authorized users;
    creating a first distributed ledger transaction to transfer the bundle of offtake tokens from the originator portfolio to an issuer portfolio relating to an issuer and associated with the distributed ledger system,
    wherein the first distributed ledger transaction is associated with a plurality of first required signers; and
    transferring the bundle of offtake tokens from the originator portfolio to the issuer portfolio, based on a determination that all of the first required signers have signed the first distributed ledger transaction consistent with the conversion/consensus rules included in the most recently added sequential block of the one or more side chains.

2. A method according to claim 1, wherein said transferring the bundle of offtake tokens to the issuer portfolio is further based on a determination that a payment has been transferred from the issuer to the originator.

3. A method according to claim 1, wherein the plurality of first required signers comprises the originator and the issuer.

4. A method according to claim 1, wherein the most recently added sequential block of the one or more side chains is provisioned to any of the one or more nodes by querying the distributed ledger so as to propagate the most current conversion/consensus rule to said one or more nodes, and wherein the plurality of first required signers further comprises a validator.

5. A method according to claim 1, further comprising:
    creating a plurality of note tokens for use with the distributed ledger system, each note token of the plurality of note tokens representing a security backed by the bundle of offtake tokens.

6. A method according to claim 5, wherein each of the plurality of note tokens is associated with note information comprising: a principal amount, an interest rate, and a maturity date.

7. A method according to claim 6, further comprising:
receiving a credit rating for the plurality of note tokens, wherein the note information further comprises the credit rating.

8. A method according to claim 5, further comprising:
creating a second distributed ledger transaction to transfer one or more of the plurality of note tokens to an investor portfolio relating to an investor and associated with the distributed ledger system.

9. A method according to claim 8, wherein said transferring the one or more note tokens to the investor portfolio is based on a determination that all of a plurality of second required signers have signed the second distributed ledger transaction.

10. A method according to claim 9, wherein said transferring the one or more note tokens to the investor portfolio is further based on a determination that a note payment has been transferred from the investor to the issuer.

11. A method according to claim 8, further comprising:
receiving purchaser payments from one or more of the purchasers associated with the offtake tokens in the bundle of offtake tokens; and
distributing a portion of the purchaser payments to the investor based on the note information of the one or more note tokens.

12. A method according to claim 5, further comprising:
storing credit enhancement information comprising: a credit enhancement portfolio for use with the distributed ledger system; and
one or more credit enhancement rules specifying when funds held in the credit enhancement portfolio are to be distributed to holders of the note tokens.

13. A method according to claim 12, wherein at least a portion of the credit enhancement portfolio funds is provided via a credit card loans portfolio that is itself funded from credit card loans proceeds.

14. A method according to claim 1, wherein the distributed ledger system comprises a blockchain system.

15. A non-transitory computer readable medium comprising executable instructions, the executable instructions, while executed, causing a processor to perform processing steps comprising:
creating a plurality of digital offtake tokens, for each digital offtake token respectively representing one of a plurality of offtake agreements;
storing at least one of the digital offtake tokens on a distributed ledger system;
associating each of the offtake tokens with an originator portfolio relating to an originator and associated with the distributed ledger system to thereby create a bundle of offtake tokens;
storing on the distributed ledger one or more side chains comprising conversion/consensus rules governing the bundle of offtake tokens;
propagating any change to the conversion/consensus rules by adding blocks to the side chains with modifications to such conversion/consensus rules;
identifying and aggregating information stored on the distributed ledger system and associated with a unique asset ID of one of the offtake agreements;
dynamically compiling a digital offtake record having historical information respectively associated with at least one of the offtake agreements;
storing on the distributed ledger system the digital offtake record;
providing access to at least some of the digital offset record via a graphical user interface to authorized users; and
executing a first distributed ledger transaction to transfer the bundle of offtake tokens from the originator portfolio to an issuer portfolio relating to an issuer and associated with the distributed ledger system consistent with the conversion/consensus rules included in the most recently added sequential block of the one or more side chains.

16. The non-transitory computer readable medium of claim 15, wherein said transferring the bundle of offtake tokens to the issuer portfolio is based on a determination that a payment has been transferred from the issuer to the originator, and wherein the most recently added sequential block of the one or more side chains is provisioned to a node having access to the distributed ledger system by querying the distributed ledger so as to propagate the most current conversion/consensus rule to said node.

17. The non-transitory computer readable medium of claim 15, wherein the executable instructions, while executed, cause the processor to perform a further processing step of:
creating a plurality of note tokens for use with the distributed ledger system, each note token of the plurality of note tokens representing a security backed by the bundle of offtake tokens,
wherein each of the plurality of note tokens is associated with note information comprising one or more of: a principal amount, an interest rate, and a maturity date.

18. The non-transitory computer readable medium of claim 17, wherein the executable instructions, while executed, cause the processor to perform a further processing step of:
executing a second distributed ledger transaction to transfer one or more of the plurality of note tokens to an investor portfolio relating to an investor and associated with the distributed ledger system.

19. The non-transitory computer readable medium of claim 18, wherein said transferring the one or more note tokens to the investor portfolio is based on a determination that a note payment has been transferred from the investor to the issuer.

20. The non-transitory computer readable medium of claim 18, wherein the executable instructions, while executed, cause the processor to perform a further processing step of:
receiving purchaser payments from one or more of the purchasers associated with the offtake tokens in the bundle of offtake tokens; and
distributing a portion of the purchaser payments to the investor based on the note information of the one or more note tokens.

* * * * *